United States Patent

[11] 3,572,816

| [72] | Inventor | Robert L. Brown |
| | | 322 Davis Drive, Kingston, Tenn. 37763 |
| [21] | Appl. No. | 806,389 |
| [22] | Filed | Mar. 12, 1969 |
| [45] | Patented | Mar. 30, 1971 |

[54] VEHICLE SEAT
6 Claims, 5 Drawing Figs.

[52] U.S. Cl. .................................................. 296/63,
172/435, 297/459
[51] Int. Cl. .................................................. B60n 1/00
[50] Field of Search .......................................... 296/63, 64;
297/458, 459, 195, 452; 172/435

[56] References Cited
UNITED STATES PATENTS
| 1,390,506 | 9/1921 | Carter | 296/63UX |
| 1,992,116 | 2/1935 | Bornman | 172/435X |

*Primary Examiner*—Kenneth H. Betts
*Assistant Examiner*—John A. Pekar
*Attorney*—Paul E. Hodges

ABSTRACT: An arcuate seat for riding implements which extends transversely to the direction of travel of the implement, whereby a rider may change sitting positions along the seat when the implement moves over a nonhorizontal surface.

PATENTED MAR 30 1971

INVENTOR
ROBERT L. BROWN

BY Paul E. Hodges
attorney

INVENTOR
ROBERT L. BROWN

3,572,816

VEHICLE SEAT

BACKGROUND OF INVENTION

This invention relates to seats for riding implements such as tractors, especially tractors of the class commonly referred to as "lawn tractors" or "riding lawn mowers."

Since their introduction, riding tractors and like implements have been plagued by the problem of rider discomfort, loss of balance, or even dislodgment of the rider from the tractor when traveling over a surface which causes the tractor to tilt. This tilt can be severe enough to overturn the tractor and endanger the life and limb of the rider. The prior art includes many tractor seats designed to eliminate the discomfort or dislodgement of a rider. Generally, these prior art seats do no more than pivot to accomodate the tractor tilt and return the to a vertical attitude.

The propensity of a riding implement to overturn when tilted laterally, as when traversing a slope, is in part a function of the relative displacement of two vectorial quantities. Referring to the prior art depicted in FIG. 3, these vectors are shown at 26 and 27. Vector 26 represents the contribution of the rider to the "overturn propensity" of the implement. This vector originates at the center of gravity of the rider and depends vertically to ground level 28. Vector 27 represents the contribution of the implement to its "overturn propensity." This vector originates at the center of gravity of the implement and also depends vertically to ground level. Both vectors 26 and 27 represent the gravitational forces acting upon the rider and implement. The magnitude and direction of each vector remains constant whether the implement is traversing level ground or a sloped bank. The relative displacement of the vectors is critical, however, to the "overturn propensity" of the implement. Both lateral displacement of the vectors and vertical displacement of the rider's center of gravity (RCG) and the implement's center of gravity (ICG) relative to each other are critical in this regard. Moreover, the vertical alignment or disalignment of these centers of gravity are of importance.

Other factors also contribute to the overturn propensity of a riding implement, for example, the width of the wheel base, or the relative weights of the rider and implement.

The prior art includes seats which pivot about an axis just below the seat so as to permit the operator to so adjust the seat as to maintain himself vertically oriented at all times. This adjustment, in the prior art, may be manually performed or automatically accomplished, the latter involving complex apparatus which is expensive to fabricate. Most usually, the prior art seats are not universally adaptable, rather each seat is intended for a specific implement.

The relatively short radial distance from the pivot axis and seat of the prior art so severely restricts the angular displacement of the seat as to provide no appreciable improvement of the overturn propensity of the implement. This factor is extremely important in connection with the riding lawn mower class of implements. These implements possess a narrow wheel base width and the weight of the rider is a significant portion of the combined weight of rider and implement. Because of these later factors, relatively small displacements of the RCG become critical in establishing the overturn propensity of the implement.

Additionally, since the rider's weight is significantly influential upon riding lawn mowers, etc., any shifting of the direction of this influence away from a point equidistant between the driving wheels of the implement results in loss of traction of one of the driving wheels.

SUMMARY OF INVENTION

The present invention comprehends an implement seat for a riding implement. The seat comprises an arcuate member mounted on the implement and adapted to support a rider in sitting position. Preferably, the arcuate length of the seat is equal to or slightly greater than the width of the implement. The arc followed by the arcuate member lies generally perpendicularly to the principal axis of the implement. The focus of the arc is at a point equidistant from and between either side of the implement. This focus also is located in the approximate plane of the surface over which the implement is traveling.

When the implement tilts laterally during operation, the rider slides or moves laterally to a position on the arcuate seat which returns the rider to a proper vertical attitude. This move by the rider returns his spine to a vertical position and eliminates the discomfort present when operating a tilted tractor having a prior seat. Because the seat is arcuate as described hereinbefore, when the rider shifts his position, the vector 26 (FIG. 4) extends radially from the RCG to the focus of the arcuate seat. Consequently, the contribution of the rider to the overturn propensity of the implement is zero. Further, the rider's weight remains equally distributed between the two driving wheels and the wheels have equal traction. Therefore, the rider remains comfortable, the implement and rider weight remains evenly distributed between the wheels for maintaining traction thereof, and overturning of the implement as a consequence of a shift in rider's position is precluded. It will be recognized that the present invention does not preclude all chances of an implement overturning. On the other hand, so long as the arcuate seat does not extend excessively laterally past the implement wheels and the rider remains in a vertical attitude, there will be no overturning of the implement due to a shift of the rider.

BRIEF DESCRIPTION OF THE FIGS.

Figure 3:
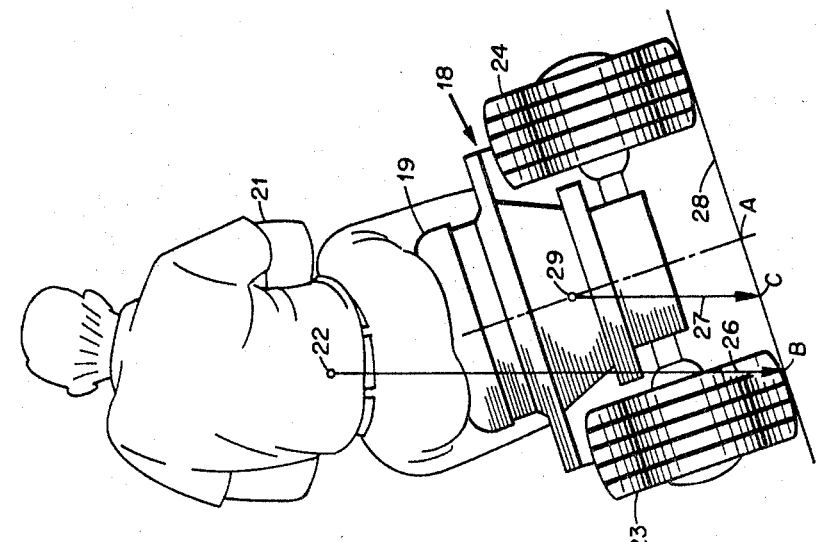
Figure 4:
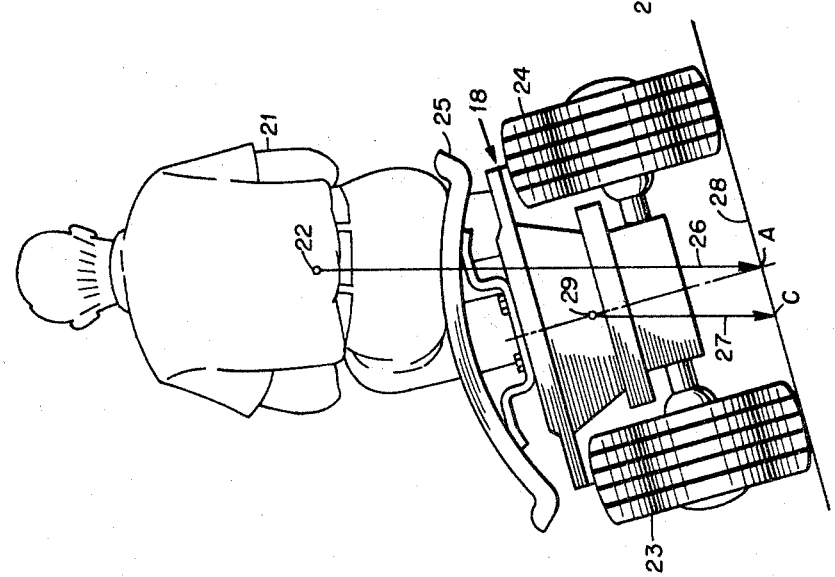
Figure 5:
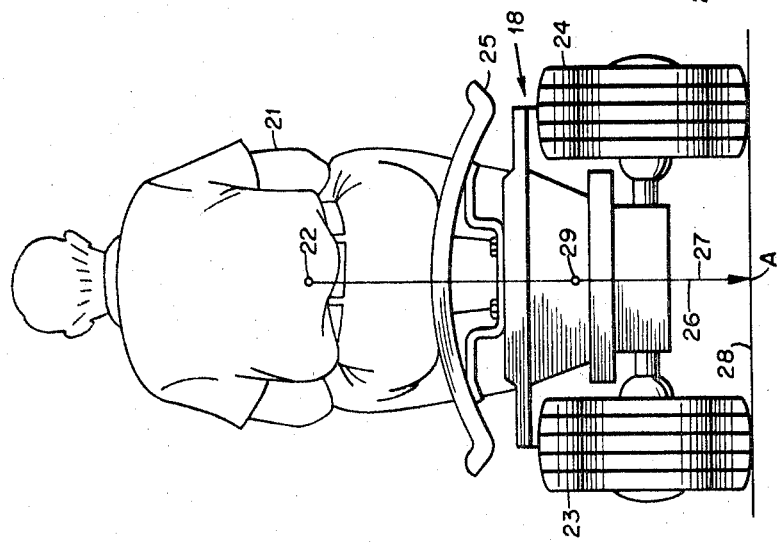

FIG. 3 is a schematic representation of a prior art implement seat as mounted on a lawn tractor, and depicting the rider position when the tractor is disposed on a nonhorizontal surface; and, FIGS. 4 and 5 are schematic representations of the present implement seat as mounted on a lawn tractor, and depicting the rider position when the tractor is on a horizontal surface and when it is on a nonhorizontal surface.

DESCRIPTION OF INVENTION

Figure 1:
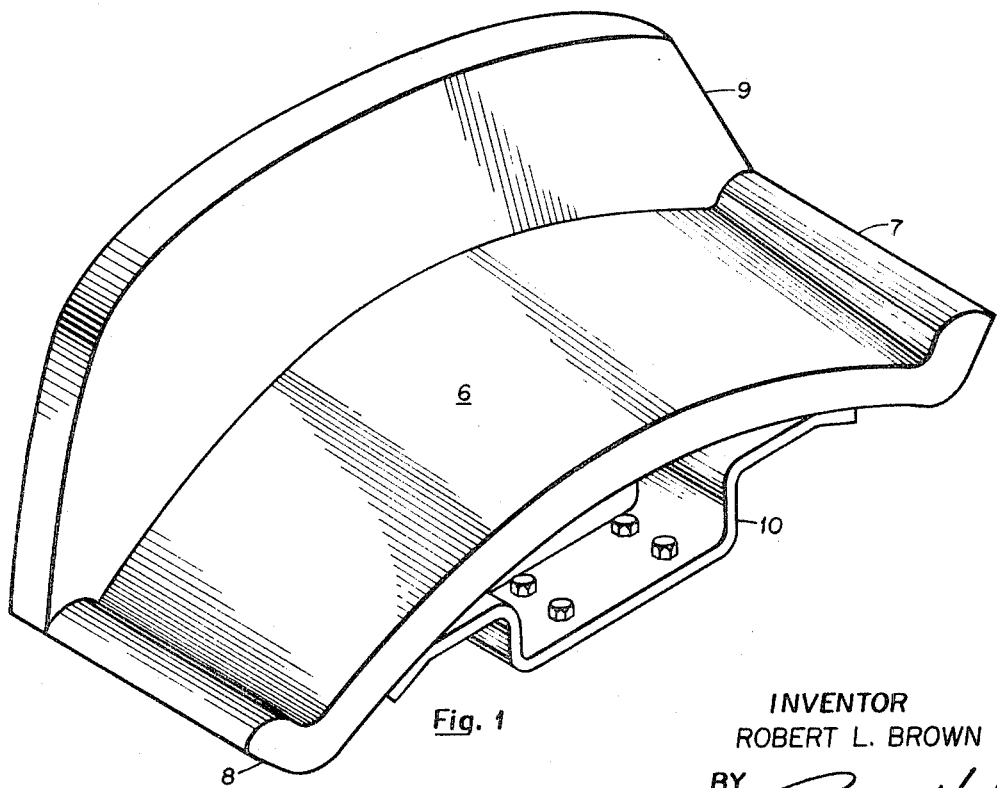
FIG. 1 is an isometric representation of one embodiment of the present implement seat.

Referring to FIG. 1, the present implement seat comprises an arcuate portion 6 forming the surface upon which a rider sits, lateral portions 7 and 8 extending generally upward from either end of arcuate portion 6 and serving to limit lateral sliding movements of a rider, and a backrest 9. Mounting means 10 of any appropriate type may be provided for securing the seat to the tractor. The embodiment of FIG. 1 is readily adaptable to those fabrication techniques, such as moulding, which yield unitary products.

The present implement seat is useful on many different implements where the rider's weight is a significant part of the combined weight of the implement and rider. Its principal use, however, is as a seat for lawn tractors, including riding mowers, etc. For purposes of this disclosure, only this principal use will be discussed. Other uses will be obvious to one skilled in this art.

Figure 2:
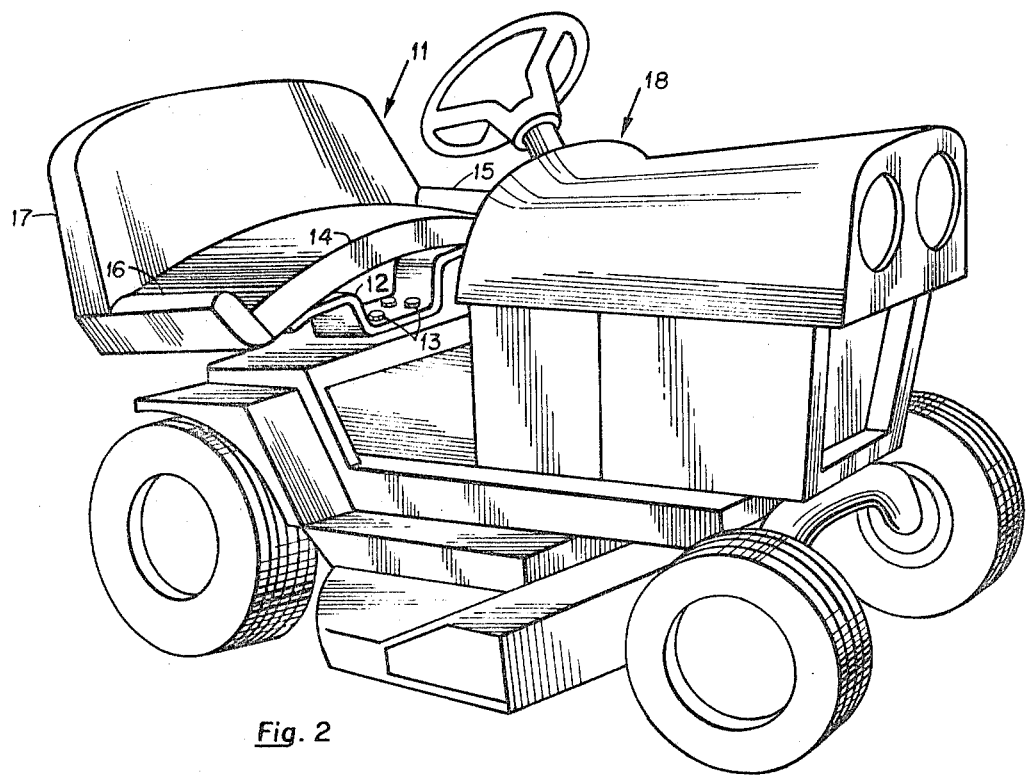
FIG. 2 is a representation of one embodiment of the present implement seat as mounted on a lawn tractor.

In FIG. 2, a lawn tractor 8 is depicted with a seat 11 mounted thereon by bracket means 12 disposed between the tractor and seat. Bolts 13 or the like may be employed to secure bracket 12 to the tractor. If preferred, bracket means 12 may be fabricated of spring steel to resiliently support the seat atop the tractor and increase rider comfort.

The seat 11 depicted in FIG. 2 includes an arcuate portion 14, sideboards 15 and 16, and a backrest 17. In the embodiment of FIG. 2, the sideboards and backrest are separate members. They are, therefore, optional in this embodiment.

A lawn tractor 18 equipped with a prior art seat 19 is depicted in FIG. 3. The tractor 18 is shown in a tilted altitude, such as occurs when the tractor is driven along a sloping surface 28. The position of a rider 21 aboard such a tilted tractor, and his influence, are depicted. First, the physical discomfort of the rider appears evident. His spine is severely bent. Second, the RCG 22 is vertically misaligned with respect to the ICG 29 and vectors 26 and 27 are laterally separated, vector 26 terminating at a point B on ground level 28 beneath wheel 23. Vector 27, representing the implement, is also displaced from a condition of normalcy (point A) to ground level 28 and terminates at a point C on ground level. It is to be noted that points B and C are both on the same side of point A, thus both the rider influence and implement influence are increasing the overturn propensity of the implement. Third, the rider's weight is exerted more on wheel 23 than wheel 24, which responds by spinning uselessly.

FIG. 4 depicts the same tilted lawn tractor 18 and rider 21 as in FIG. 3. However, in FIG. 4, the seat 25 is according to the present invention. In FIG. 4, the rider's spine is vertically oriented. It is not bent uncomfortably. Further, the rider's center of gravity 22 is vertically aligned over a point A on ground level equidistant between the driving wheels 23 and 24. This rider attitude results in: (1) distribution of his weight equally to each wheel; neither wheel loses its traction even though the tractor is substantially tilted laterally, and (2) orientation and termination of vector 26 such that the rider influence on overturn propensity equals zero.

The tractor is thus rendered more effective and safer. At the same time, the rider is disposed comfortably.

When the tractor, equipped with the present inventor's seat, travels over a level surface, the rider assumes the usual position for such circumstances. FIG. 5 depicts this situation.

The radius of curvature of the arcuate portion 6 (see FIG. 1) of the present seat is preferably chosen such that the focus A of the radii is located at a point equidistant from and lying between the lateral extremities (normally the rear wheels) of the tractor. This focus A also lies in the approximate plane of the surface upon which the tractor is traveling (see FIG. 4 and 5). When the seat is mounted directly over the driving wheels, this focus will lie at a point equidistant from and between the driving wheels and also in the approximate plane of the supporting surface.

If desired, one may increase the radius of curvature of the arcuate seat to compensate for the influence of the implement or decrease the radius of curvature when the rider's weight is insignificant, or where less curvature would increase his personal comfort.

In its preferred embodiment, the present seat is of unitary construction. Moulded plastic seats, for example, are strong, inexpensive, durable and possess a relatively slick surface which facilitates rider movements along the arcuate portion of the seat.

It is significant in the preferred embodiment of the present invention that there are no adjustments of the seat necessary to be made. The rider's only motion is a natural shifting of his position on the seat. No complicated compensation mechanisms are required, yet the overturn propensity of the implement is "automatically" reduced to a minimum.

Additionally the present invention is universally mountable and inexpensive to fabricate.

Whereas it is contemplated that a rider will sit upon the present arcuate seat, it is recognized that he could interpose some device between himself and the seat. Such a device might comprise a cushion, an auxiliary bucket seat movably disposed on the arcuate seat, or other like object.

The preferred embodiments of the present invention are depicted herein. One skilled in the art will recognize however that the entire seat need not be arcuate. Rather, it is essential only that the rider-receiving surface be arcuate—the remainder of the seat may assume any appropriate configuration.

I claim:

1. An implement seat for a riding implement, said seat having a lateral dimension disposed transversely of the direction of travel of said implement comprising an arcuately-surfaced member adapted to receive a rider in sitting position thereon, said member having its arcuate dimension aligned generally transversely with respect to the direction of movement of said implement and adapted to receive a rider in sitting position thereon, the focus of said arcuate surface residing beneath said implement approximately equidistant from the sides thereof and in the approximate plane of the surface supporting said implement, the arcuate dimension of said member being sufficient to span at least a major portion of the lateral dimension of said implement, whereby said rider seated on said arcuate surface may change sitting positions along said arcuate surface as said implement moves over a nonhorizontal surface and thereby remain in an upright position without increasing the overturn propensity of said implement as a consequence of said change in rider position on said member.

2. The invention of claim 1 wherein said arcuately-surfaced member includes upstanding portions at its lateral extremities adapted to preclude lateral dislodging of the rider.

3. The implement seat of claim 1 and including mounting means for securing said arcuately-surfaced member on said implement in position to receive said rider.

4. A unitary implement seat for riding implements having a gross weight such that the rider's seat contributes significantly to the overturn propensity of the implement, said seat having a lateral dimension disposed transversely of the direction of travel of said implement and comprising an arcuately-surfaced member disposed on said implement and adapted to receive a rider in a sitting position upon the arcuate surface thereof, wherein the arc of said surface of said member lies substantially transversely to the direction of movement of said implement and the focus of the arc is located substantially equidistant from either side of said implement and in the approximate plane of the surface supporting said implement, the arcuate dimension of said member being sufficient to cause said member to span at least a major portion of the lateral dimension of said implement, whereby said rider seated on said arcuate surface may change sitting positions along said arcuate surface as said implement moves over a nonhorizontal surface and thereby remain in an upright position without increasing the overturn propensity of said implement as a consequence of said change in rider position on said member.

5. The invention of claim 4 wherein said arcuately-surfaced member includes upstanding portions at its lateral extremities adapted to preclude lateral dislodging of the rider.

6. A self-propelled riding implement of decreased propensity toward overturning and having at least two laterally disposed driving wheels, said implement being characterized by its seat wherein said seat comprises an arcuately-surfaced member disposed on the top side of said implement being characterized by its seat wherein said seat comprises an arcuately-surfaced member disposed on the top side of said implement and approximately over the driving wheels thereof, the focus of said member residing directly beneath the center of said member, approximately equidistant from either driving wheel, and in the approximate plane of the surface over which said implement travels.